United States Patent
Ren et al.

(10) Patent No.: US 12,490,205 B2
(45) Date of Patent: Dec. 2, 2025

(54) METHODS AND DEVICES OF INFORMATION TRANSMISSION AND INFORMATION RECEPTION, AND TERMINAL

(71) Applicant: DATANG MOBILE COMMUNICATIONS EQUIPMENT CO., LTD., Beijing (CN)

(72) Inventors: Xiaotao Ren, Beijing (CN); Rui Zhao, Beijing (CN); Fangchen Cheng, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 456 days.

(21) Appl. No.: 17/775,401

(22) PCT Filed: Nov. 2, 2020

(86) PCT No.: PCT/CN2020/125769
§ 371 (c)(1),
(2) Date: May 9, 2022

(87) PCT Pub. No.: WO2021/088748
PCT Pub. Date: May 14, 2021

(65) Prior Publication Data
US 2022/0394637 A1     Dec. 8, 2022

(30) Foreign Application Priority Data
Nov. 8, 2019   (CN) .......................... 201911089316.1

(51) Int. Cl.
*H04W 56/00*     (2009.01)
*H04L 5/00*      (2006.01)

(52) U.S. Cl.
CPC ......... *H04W 56/001* (2013.01); *H04L 5/0048* (2013.01)

(58) Field of Classification Search
CPC .............. H04W 56/001; H04W 76/14; H04W 56/0015; H04W 76/23; H04L 5/0048;
(Continued)

(56) References Cited

U.S. PATENT DOCUMENTS

2019/0141693 A1   5/2019   Guo et al.
2019/0373570 A1   12/2019  Yokomakura et al.
(Continued)

FOREIGN PATENT DOCUMENTS

CN   108366029 A   8/2018
CN   108810983 A   11/2018
(Continued)

OTHER PUBLICATIONS

R1-1910057 (Year: 2019).*
(Continued)

*Primary Examiner* — Kodzovi Acolatse
*Assistant Examiner* — Anindita Sen
(74) *Attorney, Agent, or Firm* — Harness, Dickey & Pierce, P.L.C.

(57) ABSTRACT

Methods and devices of transmitting and receiving information and a terminal are provided. The information transmission method includes transmitting a first synchronization signal block SSB, wherein the first SSB includes a physical broadcast channel PBCH, the first SSB is configured in a first manner or carries first information, the first information indicates first offset information about a time-domain position of a second synchronization signal block SSB relative to a first position.

16 Claims, 5 Drawing Sheets

(58) Field of Classification Search
CPC . H04L 5/0007; H04L 27/2613; H04L 5/0078; H04L 5/0094

See application file for complete search history.

(56) References Cited

U.S. PATENT DOCUMENTS

| | | | |
|---|---|---|---|
| 2020/0068514 A1 | 2/2020 | Liu et al. | |
| 2020/0305125 A1 | 9/2020 | Tang et al. | |
| 2020/0359343 A1 | 11/2020 | Da et al. | |
| 2021/0092700 A1* | 3/2021 | Ko | H04W 72/23 |
| 2021/0235404 A1* | 7/2021 | Li | H04L 27/2666 |
| 2021/0320766 A1* | 10/2021 | Li | H04L 5/006 |
| 2021/0344470 A1* | 11/2021 | Si | H04L 27/2602 |
| 2021/0392592 A1* | 12/2021 | Ko | H04W 72/0446 |

FOREIGN PATENT DOCUMENTS

| | | |
|---|---|---|
| CN | 109076478 A | 12/2018 |
| CN | 109155728 A | 1/2019 |
| CN | 109474369 A | 3/2019 |
| CN | 110035493 A | 7/2019 |
| CN | 110050452 A | 7/2019 |
| CN | 110235477 A | 9/2019 |
| WO | WO-2019/052443 A1 | 3/2019 |
| WO | WO-2019/109378 A1 | 6/2019 |
| WO | WO-2019/143937 A1 | 7/2019 |
| WO | WO-2021/049886 A1 | 3/2021 |

OTHER PUBLICATIONS

Written Opinion and ISR dated Jan. 28, 2021 for International Application No. PCT/CN2020/125769.

CATT, "Sidelink synchronization mechanism in NR V2X", Agenda Item 7.2.4.3, 3GPP TSG RAN WG1 Meeting #98bis, R1-1910330, Oct. 14-18, 2019, Chongqing, China.

Samsung, "On Synchronization Mechanisms for NR V2X", 3GPP TSG RAN WG1 #98bis, R1-1910473, Oct. 14-20, 2019, Chongqing, China.

Huawei, Hisilicon, Sideline synchronization mechanisms for NR V2X, Agenda Item 7.2.4.3, 3GPP TSG RAN WG1 Meeting #98bis, , R1-1910057, Oct. 14-20, 2019, Chongqing, China.

NTT DOCOMO, Inc., "Sidelink synchronization mechanism" Agenda Item 7.2.4.1.3, 3GPP TSG RAN WG1 Meeting #95, R1-1813319, Nov. 12-16, 2018, Spokane, USA.

OPPO, "Enhancements to initial access procedure for NR-U", Agenda Item 7.2.2.2., 3GPP TSG RAN WG1 #97, R1-1906487, May 13-17, 2019, Reno USA.

Spreadtrum Communications, Discussion on synchronization mechanism for NR V2X, Agenda Item 7.2.4.3, 3GPP TSG RAN WG1 Meeting #97, R1-1906364, May 13-17, 2019, Reno, USA.

Chinese Office Action dated Sep. 23, 2021 for CN Application No. 2019110893161.1.

LG Electronics, "Discussion on NR sidelink synchronization mechanism", Agenda item 7.2.4.3, 3GPP TSG RAN WG1 #98bis Meeting, R1-1911458, Oct. 14-20, 2019, Chongqing, China.

CATT, "Feature lead summary on A1 7.2.4.3 Sidelink synchronization mechanism", Agenda Item 7.2.4.3, 3GPP TSG RAN WG1 Meeting #98bis, R1-1911669, Oct. 14-20, 2019, Chongqing, China.

Extended European Search Report dated Nov. 18, 2022 for European Patent Application No. 20884473.8.

Chinese Office Action dated Sep. 23, 2021 for CN Application No. 201911089316.1.

* cited by examiner

Transmitting a first synchronization signal block SSB, wherein the first SSB includes a physical broadcast channel PBCH, first information is configured or carried in a first manner, the first information indicates first offset information about a time-domain position of a second synchronization signal block SSB relative to a first position ⎯ 11

Fig.1

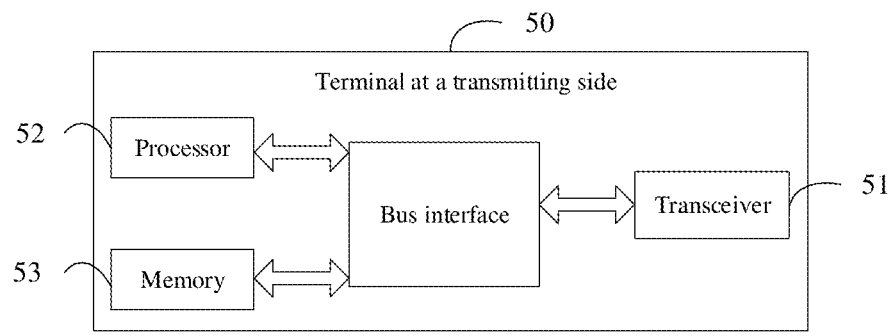
Receiving a first synchronization signal block (SSB), wherein the first SSB includes a physical broadcast channel (PBCH), first information is configured or carried in a first manner, the first information indicates first offset information about a time-domain position of a second synchronization signal block (SSB) relative to a first position — 41
Fig. 4
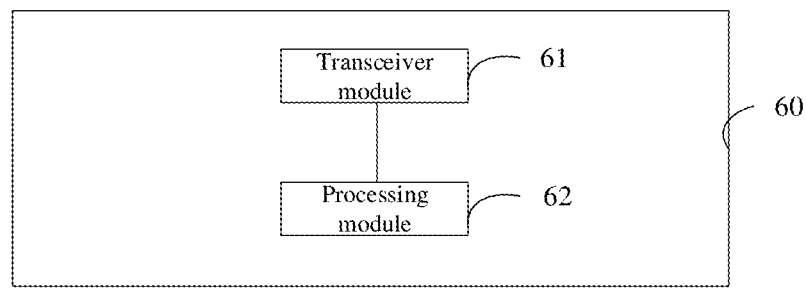
Fig. 5
Fig. 6

METHODS AND DEVICES OF INFORMATION TRANSMISSION AND INFORMATION RECEPTION, AND TERMINAL

CROSS-REFERENCE TO RELATED APPLICATIONS

This application is a U.S. national phase application of a PCT Application No. PCT/CN2020/125769 filed on Nov. 2, 2020, which claims priority to Chinese Application No. 201911089316.1, filed in China on Nov. 8, 2019, the disclosures of which are incorporated in their entirety by reference herein.

TECHNICAL FIELD

The present disclosure relates to the field of communications technologies, in particular, relates to an information transmission method, an information reception method, an information transmission device, an information reception device, and a terminal.

BACKGROUND

In a 5G New Radio (NR) Vehicle to everything (V2X) system, a terminal and another terminal perform direct communication therebetween by using a PC5 (Sidelink) interface. Prior to transmission of service data, it is first necessary to establish synchronization between the two terminals at the PC5 (Sidelink) interface. A method of establishing synchronization is that a terminal A sends a signal for synchronization and broadcast, the other terminal B receives the signal for synchronization and broadcast sent by the terminal A, and once the terminal B receives and demodulates successfully, the two terminals can establish synchronization and prepare for a next step of direct communication.

A synchronization signal through a NR UU port is carried by a Synchronization Signal Block (SSB). Each slot (slot) carries 2 SSB blocks and there is no time-domain repetition mechanism for a PSS (Primary Synchronization Signal) signal and a SSS (Secondary Synchronization Signal) signal.

In order to complete beam measurement and beam selection, beam-scanning needs to be performed on the SSB of the NR UU interface. The beam-scanning means that a base station sends the SSB in each possible beam directions once in a certain time interval (5 ms). Then, the terminal measures a signal strength of each beam for the SSB and reports a measurement result to the base station, and the base station selects a most suitable beam according the measurement result reported by the terminal, to transmit data to the terminal. Depending on different carrier frequencies and different sub-carrier spacings, the number of directions that need to be scanned varies. The maximum values of SSB beam-scanning candidate directions in different carrier frequency ranges are respectively 4/8/64, and the number of actually configured beam-scanning directions cannot exceed this maximum value.

In the related Long Term Evolution (LTE) V2X technology, at most three synchronization subframes are configured every 160 ms on the Sidelink, and the UE transmits and receives Sidelink synchronization signals and broadcast information on these synchronization subframes, and the UE does not perform beam-scanning when transmitting and receiving synchronization signals and broadcast information on these synchronization subframes. With emergence of 5G NR, a technology called Vehicle-to-Everything (V2X) is further developed to meet needs of new application scenarios. The 5G NR supports larger bandwidths, flexible configuration of subcarrier spacings, and transmission of synchronization signals and broadcast information in forms of SSB beam-scanning or beam repetition. This brings a new challenge to a design of a structure of a NR V2X physical layer. The original scheme of transmission and reception of the synchronization signal and the broadcast information performed by the UE on the synchronization subframe needs to be redesigned. A mechanism of SSB beam-scanning or beam repetition needs to be introduced to meet requirements of the NR V2X.

The introduction of SSB beam-scanning or beam repetition in the NR V2X will result in multiple synchronization signal blocks being transmitted in one synchronization period, it is an urgent problem to determine positions of a radio frame header in which multiple synchronization signal blocks are located.

SUMMARY

Embodiments of the present disclosure provide an information transmission method, an information transmission device, an information reception method, an information reception device and a terminal. The methods and the devices may enable the terminal to determine a position of a header of a radio frame according to a position of a synchronization signal block, so that the terminal may complete a synchronization process according to received related information of the synchronization signal block.

To solve the above technical problems, embodiments of the present disclosure provide the following technical solutions:

An information transmission method performed by a terminal is provided. The method includes: transmitting a first synchronization signal block (SSB), wherein the first SSB includes a physical broadcast channel (PBCH), first information is configured or carried in a first manner, the first information indicates first offset information about a time-domain position of a second synchronization signal block (SSB) relative to a first position.

Optionally, the first manner refers to at least one of following: a preconfigured manner, a manner of carrying in a PBCH payload, and a manner of carrying in a DeModulation Reference Signal (DMRS) corresponding to the PBCH.

Optionally, the second SSB refers to a SSB sent earliest in a time domain in a synchronization signal block (SSB) burst set to which the first SSB belongs, or, refers to a SSB sent latest in the time domain in the SSB burst set to which the first SSB belongs.

Optionally, the first position refers to a start time-domain position of a radio frame to which the first SSB or the second SSB belongs; or, the first position refers to an end time-domain position of a radio frame to which the first SSB or the second SSB belongs; or, the first position refers to a start time-domain position of a synchronization period to which the first SSB or the second SSB belongs; or, the first position refers to an end time-domain position of a synchronization period to which the first SSB or the second SSB belongs.

Optionally, the time-domain position is a slot index.

Optionally, the first offset information refers to a slot index of the first SSB or the second SSB, or, the first offset information is a difference between a total quantity of slots included in a radio frame and a slot index of the first SSB or the second SSB.

Optionally, 7 bits are used by the slot index of the first SSB or the second SSB to indicate a maximum of 80 slot positions; or 2 bits or 3 bits are used by the slot index of the first SSB or the second SSB to indicate 4 or 8 slot positions.

Optionally, the PBCH further carries at least one of following: indication information of the number of uplink slots and indication information of the number of uplink symbols.

Optionally, 4 bits are used by the indication information of the number of uplink symbols to indicate 1 to 13 uplink symbols at most; or 2 or 3 bits are used by the indication information of the number of uplink symbols to indicate 4 or 8 uplink symbols.

Optionally, when the first information is configured in a pre-configured manner, a slot used by the terminal to transmit the first SSB and the second SSB is an uplink slot.

Optionally, the SSB is a sidelink synchronization signal block (S-SSB), the PBCH is a physical sidelink broadcast channel (PSBCH), and the synchronization period is a sidelink synchronization period.

An embodiment of the present disclosure further provides an information reception method performed by a terminal. The method includes: receiving a first synchronization signal block (SSB), wherein the first SSB includes a physical broadcast channel (PBCH), first information is configured or carried in a first manner, the first information indicates first offset information about a time-domain position of a second synchronization signal block (SSB) relative to a first position.

Optionally, the first manner refers to at least one of following: a preconfigured manner, a manner of carrying in a PBCH payload, and a manner of carrying in a demodulation reference signal (DMRS) corresponding to the PBCH.

Optionally, the second SSB refers to a SSB sent earliest in a time domain in a synchronization signal block burst set to which the first SSB belongs, or, refers to a SSB sent latest in the time domain in the synchronization signal block burst set to which the first SSB belongs.

Optionally, the first position refers to a start time-domain position of a radio frame to which the first SSB or the second SSB belongs; or, the first position refers to an end time-domain position of a radio frame to which the first SSB or the second SSB belongs; or, the first position refers to a start time-domain position of a synchronization period to which the first SSB or the second SSB belongs; or, the first position refers to an end time-domain position of a synchronization period to which the first SSB or the second SSB belongs.

Optionally, the time-domain position is a slot index.

Optionally, the first offset information refers to a slot index of the first SSB or the second SSB, or, the first offset information is a difference between a total quantity of slots included in a radio frame and a slot index of the first SSB or the second SSB.

Optionally, 7 bits are used by the slot index of the first SSB or the second SSB to indicate a maximum of 80 slot positions; or 2 bits or 3 bits are used by the slot index of the first SSB or the second SSB to indicate 4 or 8 slot positions.

Optionally, the PBCH further carries at least one of following: indication information of the number of uplink slots and indication information of the number of uplink symbols.

Optionally, 4 bits are used by the indication information of the number of uplink symbols to indicate 1 to 13 uplink symbols at most; or 2 or 3 bits are used by the indication information of the number of uplink symbols to indicate 4 or 8 uplink symbols.

Optionally, when the first information is configured in a pre-configured manner, a slot used by the terminal to receive the first SSB and the second SSB is an uplink slot.

Optionally, the SSB is a sidelink synchronization signal block (S-SSB), the PBCH is a physical sidelink broadcast channel (PSBCH), and the synchronization period is a sidelink synchronization period.

An embodiment of the present disclosure further provides a terminal. The terminal includes: a transceiver, a processor, and a memory, wherein a program executable by the processor is stored on the memory, wherein when the program is executed by the processor, the processor implements following: transmitting a first synchronization signal block (SSB), wherein the first SSB includes a physical broadcast channel (PBCH), first information is configured or carried in a first manner, the first information indicates first offset information about a time-domain position of a second synchronization signal block (SSB) relative to a first position.

Optionally, the first manner refers to at least one of following: a preconfigured manner, a manner of carrying in a PBCH payload, and a manner of carrying in a demodulation reference signal (DMRS) corresponding to the PBCH.

Optionally, the first position refers to a start time-domain position of a radio frame to which the first SSB or the second SSB belongs; or, the first position refers to an end time-domain position of a radio frame to which the first SSB or the second SSB belongs; or, the first position refers to a start time-domain position of a synchronization period to which the first SSB or the second SSB belongs; or, the first position refers to an end time-domain position of a synchronization period to which the first SSB or the second SSB belongs.

Optionally, the first offset information refers to a slot index of the first SSB or the second SSB, or, the first offset information is a difference between a total quantity of slots included in a radio frame and a slot index of the first SSB or the second SSB.

An embodiment of the present disclosure further provides an information transmission device applied to a terminal. The device includes a transceiver module, configured for transmitting a first synchronization signal block (SSB), wherein the first SSB includes a physical broadcast channel (PBCH), first information is configured or carried in a first manner, the first information indicates first offset information about a time-domain position of a second synchronization signal block (SSB) relative to a first position.

An embodiment of the present disclosure further provides a terminal. The terminal includes a transceiver, a processor, and a memory, wherein a program executable by the processor is stored on the memory, and when the program is executed by the processor, the processor implements following: receiving a first synchronization signal block (SSB), wherein the first SSB includes a physical broadcast channel (PBCH), first information is configured or carried in a first manner, the first information indicates first offset information about a time-domain position of a second synchronization signal block (SSB) relative to a first position.

Optionally, the first manner refers to at least one of following: a preconfigured manner, a manner of carrying in a PBCH payload, and a manner of carrying in a demodulation reference signal (DMRS) corresponding to the PBCH.

Optionally, wherein the first position refers to a start time-domain position of a radio frame to which the first SSB or the second SSB belongs; or, the first position refers to an end time-domain position of a radio frame to which the first SSB or the second SSB belongs; or, the first position refers to a start time-domain position of a synchronization period to which the first SSB or the second SSB belongs; or, the first position refers to an end time-domain position of a synchronization period to which the first SSB or the second SSB belongs.

Optionally, the first offset information refers to a slot index of the first SSB or the second SSB, or, the first offset information is a difference between a total quantity of slots included in a radio frame and a slot index of the first SSB or the second SSB.

An embodiment of the present disclosure further provides an information reception device applied to a terminal. The device includes: a transceiver module, configured for receiving a first synchronization signal block (SSB), wherein the first SSB includes a physical broadcast channel (PBCH), first information is configured or carried in a first manner, the first information indicates first offset information about a time-domain position of a second synchronization signal block (SSB) relative to a first position.

An embodiment of the present disclosure further provides a processor-readable storage medium, wherein the processor-readable storage medium stores processor-executable instructions, and the processor-executable instructions are configured to cause a processor to perform the methods.

Advantageous effects of some embodiments of the present disclosure are as follow. In the above embodiments of the present disclosure, by transmitting a first synchronization signal block (SSB), wherein the first SSB includes a physical broadcast channel (PBCH), first information is configured or carried in a first manner, the first information indicates first offset information about a time-domain position of a second synchronization signal block (SSB) relative to a first position. The terminal may be enabled to determine the position of the radio frame header according to the position of the synchronization signal block, so that the terminal may complete the synchronization process according to the received information related to the synchronization signal block.

BRIEF DESCRIPTION OF THE DRAWINGS

FIG. 1 is a flowchart of an information transmission method according to an embodiment of the present disclosure;

FIG. 4 is a flowchart of an information reception method according to an embodiment of the present disclosure;

FIG. 5 is an architecture diagram of a terminal at a transmission side according to an embodiment of the present disclosure;

FIG. 6 is a block diagram of an information transmission device according to an embodiment of the present disclosure;

DETAILED DESCRIPTION

Figure 2:
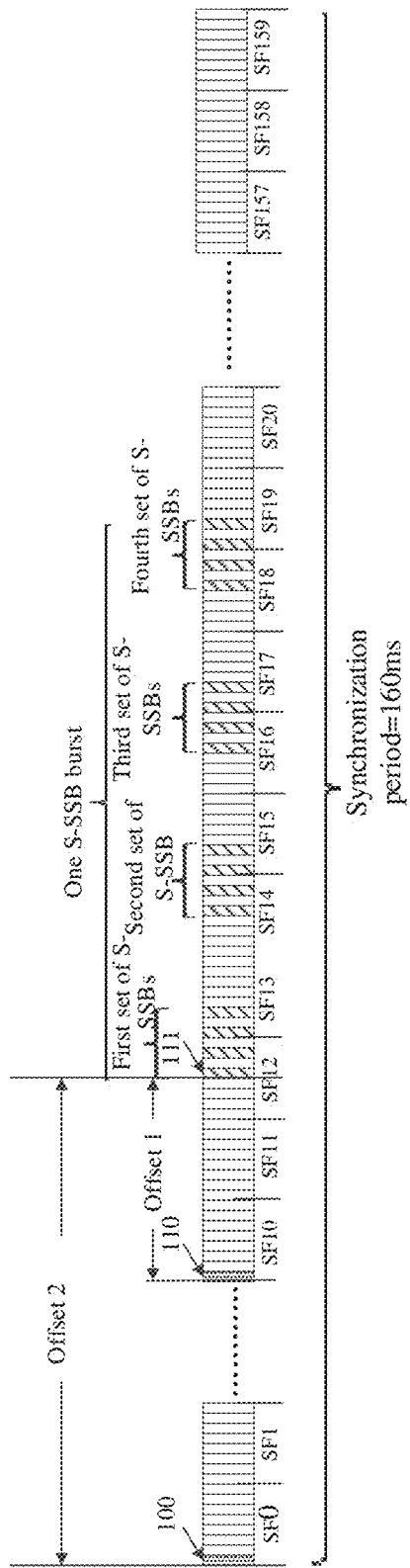
FIG. 2 is a schematic diagram of first implementation of first information in an embodiment of the present disclosure.

Exemplary embodiments of the present disclosure will be described in more detail below with reference to the accompanying drawings. Although exemplary embodiments of the present disclosure are shown in the drawings, it should be understood that the present disclosure may be implemented in various forms and should not be limited by the embodiments set forth herein. Rather, these embodiments are provided to enable a more thorough understanding of the present disclosure and to convey a full scope of the present disclosure to those skilled in the art.

As shown in FIG. 1, an embodiment of the present disclosure provides an information transmission method, which is applied to a terminal, and the method includes a step 11. In the step 11, a first synchronization signal block (SSB) is sent, wherein the first SSB includes a physical broadcast channel (PBCH), first information is configured or carried in a first manner, the first information indicates first offset information about a time-domain position of the second synchronization signal block (SSB) relative to a first position.

In the embodiment of the present disclosure, the first manner refers to at least one of following: a preconfigured manner, a manner of carrying in a PBCH payload, and a manner of carrying in a demodulation pilot reference signal (DMRS) corresponding to the PBCH.

The first SSB refers to the SSB currently transmitted by the terminal, which may be any SSB in a burst set. The second SSB refers to a SSB sent earliest in a time domain in a synchronization signal block (SSB) burst set to which the first SSB belongs, or, refers to a SSB sent latest in the time domain in the SSB burst set to which the first SSB belongs; a plurality of SSBs here form a group, each group is one burst, all S-SSBs transmitted within one synchronization period constitute an S-SSB burst set.

In an optional embodiment of the present disclosure, the first position refers to a start time-domain position of a radio frame to which the first SSB or the second SSB belongs; or, the first position refers to an end time-domain position of a radio frame to which the first SSB or the second SSB belongs; or, the first position refers to a start time-domain position of a synchronization period to which the first SSB or the second SSB belongs; or, the first position refers to an end time-domain position of a synchronization period to which the first SSB or the second SSB belongs.

Here, in case that the number of slots included in a radio frame is unchanged, the first position may refer to the starting time-domain position of the radio frame to which the first SSB or the second SSB belongs; of course, the first position may also refer to the end time-domain position of the radio frame to which the first SSB or the second SSB belongs.

Likewise, since the number of slots included in one synchronization period is unchanged, the first position may be a start time-domain position of the synchronization period to which the first SSB or the second SSB belongs, or may be an end time-domain position of the synchronization period to which the first SSB or the second SSB belongs.

In an optional embodiment of the present disclosure, the first offset information refers to a slot index of the first SSB or the second SSB, or, the first offset information is a difference between the total number of slots included in one radio frame and a slot index of the first SSB or the second SSB.

Here, the first information is carried by a channel load of a PBCH and/or a demodulation reference signal (DMRS) corresponding to the PBCH. Specifically, in order to notify the terminal of the first information, the PBCH is required to carry the first information, and the first information may be carried and transmitted through at least one of the physical broadcast channel (PBCH) payload and the demodulation reference signal (DMRS) corresponding to the PBCH. That is, the following three ways can be used:

First way: the first information is carried through the PBCH payload;

Second way: the first information is carried through a demodulation reference signal (DMRS) corresponding to the PBCH;

Third way: part of the first information is carried through the PBCH payload, and the remaining part of the first information is carried by the DMRS corresponding to the PBCH.

By adopting these manners for notification, the first information can be flexibly configured by changing the contents carried by the DMRS, that is, different contents of the first information can be configured according to different scenes.

In this embodiment, the first information may be notified to the terminal in a pre-configured manner. That is, the first information is preset, and the terminal directly reads a configured value of first information after the terminal is powered on, without signaling notification. When the first information is configured in a pre-configured manner, a slot used by the terminal to transmit or receive the first SSB and the second SSB is a first slot, then, the first slot needs to be configured by the base station as an uplink slot, or the UE assumes that the first slot is an uplink slot. If the first slot is not fixedly configured as an uplink slot, then the first slot may be configured as a downlink slot by the base station. Since the terminal can only transmit or receive a sidelink synchronization signal block in the uplink slot, the terminal cannot transmit or receive a sidelink physical broadcast channel in the first slot, thereby causing a failure of the sidelink synchronization. The notification manner in this embodiment does not occupy a signaling overhead of a physical broadcast channel.

Optionally, when the first information is configured in a preconfigured manner, the slot used by the terminal for transmitting the first SSB and the second SSB is an uplink slot.

In an embodiment of the present disclosure, the SSB is a sidelink synchronization signal block (S-SSB), the PBCH is a physical sidelink broadcast channel (PSBCH), and the synchronization period is a sidelink synchronization period.

The above described embodiments of the present disclosure use a method of carrying in PSBCH or use a method of pre-configuration, to inform the terminal of offset information about a first synchronization signal block (SSB), transmitted in one synchronization period, relative to the start position of the radio frame in which the first SSB is located, or relative to the start position of the synchronization period. In this way, the terminal may be enabled to determine a position of a header of the radio frame according to the position of the synchronization signal block, so that the terminal may complete a synchronization process according to received information related to the synchronization signal block.

In an optional embodiment of the present disclosure, optionally, the time-domain position is a slot index, and the first offset information refers to a slot index of the first SSB or the second SSB, or, the first offset information is a difference between the total number of slots included in one radio frame and a slot index of the first SSB or the second SSB. When the first information includes the offset information of the time-domain position of the second synchronization signal block (SSB) relative to the start time-domain position of the radio frame in which the first SSB or the second SSB is located, a specific implementation scheme is as follows:

As shown in FIG. 2 below, FIG. 2 is a schematic diagram of a time-domain position of transmission of an S-SSB set with a subcarrier spacing of 120 KHz. One synchronization period is 160 ms, including 160 subframes in total. Since the subcarrier spacing is 120 KHz, one subframe contains 8 slots, of course, one subframe may also contain other numbers of slots, each mini-grid represents one slot. Each blank mini-grid represents a slot that does not contain an S-SSB, and each mini-grid with slashed lines represents a slot that contains an S-SSB. Here, description is given by taking an example in which one S-SSB set includes 16 S-SSBs, and the S-SSB set is divided into four groups, each group includes four S-SSBs. During this synchronization period, the second S-SSB 111 of the entire S-SSB set is located in a subframe 12.

The first information refers to an offset 1 in FIG. 2, i.e., a time interval between a mini-grid 110 and the second S-SSB 111. If a time interval is calculated from the end of the mini-grid 110 to the start of the second S-SSB 111, then the offset 1 is 19 slots; if the time interval is calculated from the start of the mini-grid 110 to the start of the second S-SSB 111, then T1 is 20 slots. Therefore, the offset 1 in FIG. 2 is 19 slots or 20 slots.

In particular, in a radio frame, each slot has its own unique index. Since the numbers of slots included in each radio frame are different for different SCSs, a range of the indexes is related to the subcarrier spacing (SCS). In case of a SCS of 120 kHz, as shown in FIG. 2, there are 80 slots in one radio frame in total, so the slot indexes are from 0 to 79. Thus, the offset 1 can be notified by notifying the slot index, the slot index for the second S-SSB in the synchronization period is 19 in FIG. 2. Therefore, if the first information is notified in a manner of notifying the slot index, the first information is 19.

A notification manner in this embodiment can traverse all possible positions of the second S-SSB in one radio frame, and can support very flexible configuration.

Figure 3:
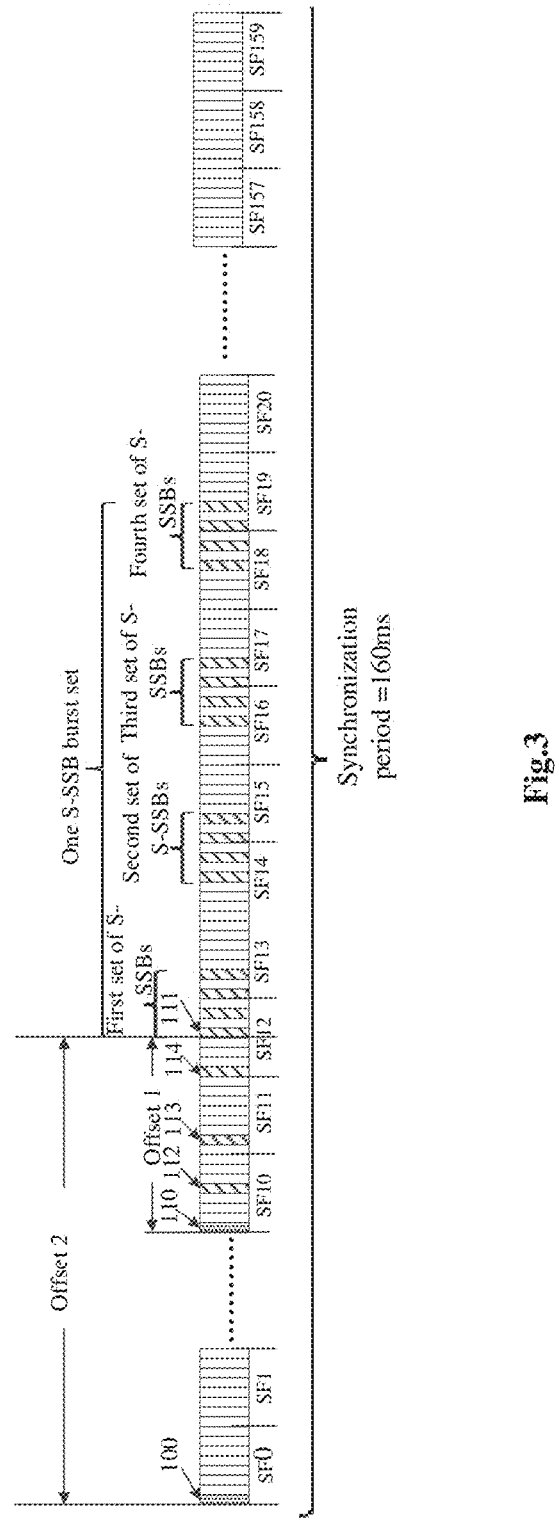
FIG. 3 is a schematic diagram of second implementation mode of first information in an embodiment of the present disclosure.

In another optional embodiment of the present disclosure, optionally, the time-domain position is a slot index, and the first offset information refers to a slot index of the second SSB, or, the first offset information is a difference between the total number of slots included in one radio frame and a slot index of the first SSB or the second SSB. When the first information includes offset information of the time-domain position of the second synchronization signal block (SSB) relative to the start time-domain position of the radio frame to which the first SSB or the second SSB belongs, another specific implementation scheme is as follows:

As shown in FIG. 3, FIG. 3 is a schematic diagram of a time-domain position of transmission of a S-SSB set with a subcarrier spacing of 120 KHz. One synchronization period is 160 ms, including 160 subframes in total. Since the subcarrier spacing is 120 KHz, one subframe contains 8 slots, of course, one subframe may also contain other numbers of slots, each mini-grid represents one slot. Each blank mini-grid represents a slot that does not contain an S-SSB, and each mini-grid with slashed lines represents a slot that contains an S-SSB. Here, description is given by taking an example in which one S-SSB set includes 16 S-SSBs, and the S-SSB set is divided into four groups, each group includes four S-SSBs. During this synchronization period, the second S-SSB 111 of the entire S-SSB set is located in a subframe 121.

The first information refers to the offset 1 in FIG. 3, i.e., the time interval between the mini-grid 110 and the second S-SSB 111. If the time interval is calculated from the end of the mini-grid 110 to the start of the second S-SSB 111, then the offset 1 is 19 slots; if the time interval is calculated from the start of the mini-grid 110 to the start of the second S-SSB 111, then T1 is 20 slots. Therefore, the offset 1 in FIG. 3 is 19 slots or 20 slots.

In particular, in a radio frame, each slot has its own unique index. Since the numbers of slots included in each radio frame are different for different SCSs, a range of the indexes is related to the subcarrier spacing (SCS). In case of a SCS of 120 kHz, as shown in FIG. 3, there are 80 slots in one radio frame in total, so the slot indexes are from 0 to 79. Thus, the offset 1 can be notified by notifying the slot index, the slot index for the second S-SSB 111 in the synchronization period is 19 in FIG. 3. Therefore, if the first information is notified in a manner of notifying the slot index, the first information is 19. In order to reduce a signaling overhead for notifying the offset 1, the position of the second S-SSB 111 cannot be arbitrarily configured, but can only be configured at four specific slots in a radio frame, as shown in FIG. 3, can only be configured at a mini-grid 112, a mini-grid 113, a mini-grid 114, and a second S-SSB 111. In this way, the signaling overhead for the offset 1 may be reduced.

In this notification manner of this embodiment, since not all 80 possible positions need to be notified in case of the SCS of 120 KHz, but only preset four positions need to be notified, only two bits are needed, and the required signaling overhead is insignificant.

In yet another optional embodiment of the present disclosure, optionally, the time-domain position is a slot index. The first offset information may refer to a time interval between the second SSB and the first SSB or the start time-domain position of the synchronization period to which the second SSB belongs, such as the number of slots spaced therebetween. When the first information includes offset information of a time-domain position of the second synchronization signal block (SSB) relative to a start time-domain position of the synchronization period of the first SSB or the second SSB, the specific implementation scheme is as follows:

As shown in FIG. 2 below, FIG. 2 is a schematic diagram of a time-domain position of transmission of an S-SSB set with a subcarrier spacing of 120 KHz. One synchronization period is 160 ms, including 160 subframes in total. Since the subcarrier spacing is 120 KHz, one subframe contains 8 slots, of course, one subframe may also contain other numbers of slots, each mini-grid represents one slot. Each blank mini-grid represents a slot that does not contain an S-SSB, and each mini-grid with slashed lines represents a slot that contains an S-SSB. Here, description is given by taking an example in which one S-SSB set includes 16 S-SSBs, and the S-SSB set is divided into four groups, each group includes four S-SSBs. During this synchronization period, the second S-SSB 111 of the entire S-SSB set is located in a subframe 12.

The first information refers to an offset 2 in FIG. 2, i.e., a time interval between a mini-grid 110 and the second S-SSB 111. If a time interval is calculated from the end of the mini-grid 110 to the start of the second S-SSB 111, then the offset 2 is 99 slots; if the time interval is calculated from the start of the mini-grid 110 to the start of the second S-SSB 111, then T1 is 100 slots. Therefore, the offset 2 in FIG. 2 is 99 slots or 100 slots.

A notification manner in this embodiment can traverse all possible positions of the second S-SSB in one synchronization period, and can support very flexible configuration.

In an optional embodiment of the present disclosure, 7 bits are used by the slot index of the first SSB or the second S-SSB to indicate a maximum of 80 possible slot position; or, 2 bits or 3 bits are used by the slot index of the first SSB or the second S-SSB to indicate 4 or 8 possible slot positions.

In an optional embodiment of the present disclosure, the PBCH further carries at least one of following: indication information of the number of uplink slots and indication information of the number of uplink symbols.

Optionally, 4 bits are used by indication information of the number of uplink symbols to indicate a maximum of 1 to 13 uplink symbols, or 2 bits or 3 bits are used by indication information of the number of uplink symbols to indicate 4 or 8 uplink symbols. The specific implementation is as follows.

First implementation: first information is transmitted through a physical sidelink broadcast channel. The first information refers to the slot index of the second S-SSB in a sidelink synchronization period. In addition to the first information, other information also needs to be transmitted in the physical sidelink broadcast channel, as shown in the following table, contents that at least need to be included in a payload of the physical sidelink broadcast channel (PSBCH) are shown in this table. Note: in addition to the contents in the following table, the payload in the physical sidelink broadcast channel may also contain additional information.

| Contents in payload of PSBCH | Required number of bits | Notes |
| --- | --- | --- |
| Direct Frame Number (DirectFrameNumber) | 10 | A range of indicated Direct Frame Number: [0.1023] |
| Time-Division Duplex UL-DL configuration (TDD-UL-DL Configuration) | 14 | 14 bits = 3 bits (indicating 8 periods) + 7 bits (indicating the number of uplink slots) + 4 bits (indicating the number of uplink symbols) |
| Slot index of second S-SSB (Slot index of first S-SSB) | 7 | 7 bits are used to indicate any position of 80 possible slot positions in a radio frame in which the second S-SSB is located within a period. |

| Contents in payload of PSBCH | Required number of bits | Notes |
| --- | --- | --- |
| S-SSB index (S-SSB index) | 3 | Used to indicate first 3 bits in six bits of a slot index of S-SSB when FR2 is indicated. |
| InCoverage Indicator (InCoverage Indicator) | 1 | Indicating whether the terminal is within a coverage of a base station |
| Reserved bits (Reserved) | 2 | Reserved bits |
| Total | 37 | |

The design of the contents of the physical sidelink broadcast channel adopted in this embodiment may configure flexibly the number of uplink symbols and the contents of the first information by changing the contents carried by the physical broadcast channel, that is, different numbers of uplink symbols and contents of the first information may be configured according to different scenes. The disadvantage is that a signaling overhead for the PSBCH payload is relatively high.

Second implementation: the first information is transmitted through a physical sidelink broadcast channel. The first information refers to the slot index of the second S-SSB in a sidelink synchronization period. In addition to the first information, other information also needs to be transmitted in the physical sidelink broadcast channel, as shown in the following table, contents that at least need to be included in a payload of the physical sidelink broadcast channel (PSBCH) are shown in this table. In addition to the contents in the following table, the payload in the physical sidelink broadcast channel may also contain additional information.

The design of the contents of the physical sidelink broadcast channel adopted in this embodiment may configure flexibly the number of uplink symbols and the contents of the first information by changing the contents carried by the physical broadcast channel, that is, different numbers of uplink symbols and contents of the first information may be configured according to different scenes.

Third implementation: the first information is transmitted through a physical sidelink broadcast channel. The first information refers to the slot index of the second S-SSB in a sidelink synchronization period. In addition to the first information, other information also needs to be transmitted in the physical sidelink broadcast channel, as shown in the following table, contents that at least need to be included in a payload of the physical sidelink broadcast channel (PSBCH) are shown in this table. In addition to the contents in the following table, the payload in the physical sidelink broadcast channel may also contain additional information.

| Contents in payload of PSBCH | Required number of bits | Notes |
| --- | --- | --- |
| Direct Frame Number (DirectFrameNumber) | 10 | A range of indicated Direct Frame Number: [0.1023] |
| Time-Division Duplex UL-DL configuration (TDD-UL-DL Configuration) | 14 | 14 bits = 3 bits (indicating 8 periods) + 7 bits (indicating the number of uplink slots) + 4 bits (indicating the number of uplink symbols) |
| Slot index of second S-SSB (Slot index of first S-SSB) | 3 | 3 bits are used to indicate any position of 8 possible slot positions in a radio frame in which the second S-SSB is located within a period. |
| S-SSB index (S-SSB index) | 3 | Used to indicate first 3 bits in six bits of a slot index of S-SSB when FR2 is indicated. |
| InCoverage Indicator (InCoverage Indicator) | 1 | Indicating whether the terminal is within a coverage of a base station |
| Reserved bits (Reserved) | 2 | Reserved bits |
| Total | 33 | |

| Contents in payload of PSBCH | Required number of bits | Notes |
|---|---|---|
| Direct Frame Number (DirectFrameNumber) | 10 | A range of indicated Direct Frame Number: [0.1023] |
| Time-Division Duplex UL-DL configuration (TDD-UL-DL Configuration) | 14 | 14 bits = 3 bits (indicating 8 periods) + 7 bits (indicating the number of uplink slots) + 4 bits (indicating the number of uplink symbols) |
| Slot index of second S-SSB (Slot index of first S-SSB) | 2 | 2 bits are used to indicate any position of 4 possible slot positions in a radio frame in which the second S-SSB is located within a period. |
| S-SSB index (S-SSB index) | 3 | Used to indicate first 3 bits in six bits of a slot index of S-SSB when FR2 is indicated. |
| InCoverage Indicator (InCoverage Indicator) | 1 | Indicating whether the terminal is within a coverage of a base station |
| Reserved bits (Reserved) | 2 | Reserved bits |
| Total | 32 | |

The design of the contents of the physical sidelink broadcast channel adopted in this embodiment may configure flexibly the number of uplink symbols and the contents of the first information by changing the contents carried by the physical broadcast channel, that is, different numbers of uplink symbols and contents of the first information may be configured according to different scenes.

Fourth implementation: the first information is transmitted through a physical sidelink broadcast channel. The first information refers to the slot index of the second S-SSB in a sidelink synchronization period. In addition to the first information, other information also needs to be transmitted in the physical sidelink broadcast channel, as shown in the following table, contents that at least need to be included in a payload of the physical sidelink broadcast channel (PSBCH) are shown in this table. In addition to the contents in the following table, the payload in the physical sidelink broadcast channel may also contain additional information.

The design of the contents of the physical sidelink broadcast channel adopted in this embodiment may configure flexibly the number of uplink symbols and the contents of the first information by changing the contents carried by the physical broadcast channel, that is, different numbers of uplink symbols and contents of the first information may be configured according to different scenes.

Fifth implementation: the first information is transmitted through a physical sidelink broadcast channel. The first information refers to the slot index of the second S-SSB in a sidelink synchronization period. In addition to the first information, other information also needs to be transmitted in the physical sidelink broadcast channel, as shown in the following table, contents that at least need to be included in a payload of the physical sidelink broadcast channel (PSBCH) are shown in this table. In addition to the contents in the following table, the payload in the physical sidelink broadcast channel may also contain additional information.

| Contents in payload of PSBCH | Required number of bits | Notes |
|---|---|---|
| Direct Frame Number (DirectFrameNumber) | 10 | A range of indicated Direct Frame Number: [0.1023] |
| Time-Division Duplex UL-DL configuration (TDD-UL-DL Configuration) | 13 | 13 bits = 3 bits (indicating 8 periods) + 7 bits (indicating the number of uplink slots) + 3 bits (indicating the number of uplink symbols) |
| Slot index of second S-SSB (Slot index of first S-SSB) | 7 | 7 bits are used to indicate any position of 80 possible slot positions in a radio frame in which the second S-SSB is located within a period. |
| S-SSB index (S-SSB index) | 3 | Used to indicate first 3 bits in six bits of a slot index of S-SSB when FR2 is indicated. |
| InCoverage Indicator (InCoverage Indicator) | 1 | Indicating whether the terminal is within a coverage of a base station |
| Reserved bits (Reserved) | 2 | Reserved bits |
| Total | 36 | |

| Contents in payload of PSBCH | Required number of bits | Notes |
| --- | --- | --- |
| Direct Frame Number (DirectFrameNumber) | 10 | A range of indicated Direct Frame Number: [0.1023] |
| Time-Division Duplex UL-DL configuration (TDD-UL-DL Configuration) | 13 | 13 bits = 3 bits (indicating 8 periods) + 7 bits (indicating the number of uplink slots) + 3 bits (indicating the number of uplink symbols) |
| Slot index of second S-SSB (Slot index of first S-SSB) | 3 | 3 bits are used to indicate any position of 8 possible slot positions in a radio frame in which the second S-SSB is located within a period. |
| S-SSB index (S-SSB index) | 3 | Used to indicate first 3 bits in six bits of a slot index of S-SSB when FR2 is indicated. |
| InCoverage Indicator (InCoverage Indicator) | 1 | Indicating whether the terminal is within a coverage of a base station |
| Reserved bits (Reserved) | 2 | Reserved bits |
| Total | 32 | |

The design of the contents of the physical sidelink broadcast channel adopted in this embodiment may configure flexibly the number of uplink symbols and the contents of the first information by changing the contents carried by the physical broadcast channel, that is, different numbers of uplink symbols and contents of the first information may be configured according to different scenes.

Sixth implementation: the first information is transmitted through a physical sidelink broadcast channel. The first information refers to the slot index of the second S-SSB in a sidelink synchronization period. In addition to the first information, other information also needs to be transmitted in the physical sidelink broadcast channel, as shown in the following table, contents that at least need to be included in a payload of the physical sidelink broadcast channel (PSBCH) are shown in this table. In addition to the contents in the following table, the payload in the physical sidelink broadcast channel may also contain additional information.

The design of the contents of the physical sidelink broadcast channel adopted in this embodiment may configure flexibly the number of uplink symbols and the contents of the first information by changing the contents carried by the physical broadcast channel, that is, different numbers of uplink symbols and contents of the first information may be configured according to different scenes.

Seventh implementation: the first information is transmitted through a physical sidelink broadcast channel. The first information refers to the slot index of the second S-SSB in a sidelink synchronization period. In addition to the first information, other information also needs to be transmitted in the physical sidelink broadcast channel, as shown in the following table, contents that at least need to be included in a payload of the physical sidelink broadcast channel (PSBCH) are shown in this table. In addition to the contents in the following table, the payload in the physical sidelink broadcast channel may also contain additional information.

| Contents in payload of PSBCH | Required number of bits | Notes |
| --- | --- | --- |
| Direct Frame Number (DirectFrameNumber) | 10 | A range of indicated Direct Frame Number: [0.1023] |
| Time-Division Duplex UL-DL configuration (TDD-UL-DL Configuration) | 13 | 13 bits = 3 bits (indicating 8 periods) + 7 bits (indicating the number of uplink slots) + 3 bits (indicating the number of uplink symbols) |
| Slot index of second S-SSB (Slot index of first S-SSB) | 2 | 2 bits are used to indicate any position of 4 possible slot positions in a radio frame in which the second S-SSB is located within a period. |
| S-SSB index (S-SSB index) | 3 | Used to indicate first 3 bits in six bits of a slot index of S-SSB when FR2 is indicated. |
| InCoverage Indicator (InCoverage Indicator) | 1 | Indicating whether the terminal is within a coverage of a base station |
| Reserved bits (Reserved) | 3 | Reserved bits |
| Total | 32 | |

| Contents in payload of PSBCH | Required number of bits | Notes |
|---|---|---|
| Direct Frame Number (DirectFrameNumber) | 10 | A range of indicated Direct Frame Number: [0.1023] |
| Time-Division Duplex UL-DL configuration (TDD-UL-DL Configuration) | 12 | 12 bits = 3 bits (indicating 8 periods) + 7 bits (indicating the number of uplink slots) + 2 bits (indicating the number of uplink symbols) |
| Slot index of second S-SSB (Slot index of first S-SSB) | 7 | 7 bits are used to indicate any position of 80 possible slot positions in a radio frame in which the second S-SSB is located within a period. |
| S-SSB index (S-SSB index) | 3 | Used to indicate first 3 bits in six bits of a slot index of S-SSB when FR2 is indicated. |
| InCoverage Indicator (InCoverage Indicator) | 1 | Indicating whether the terminal is within a coverage of a base station |
| Reserved bits (Reserved) | 2 | Reserved bits |
| Total | 35 | |

The design of the contents of the physical sidelink broadcast channel adopted in this embodiment may configure flexibly the number of uplink symbols and the contents of the first information by changing the contents carried by the physical broadcast channel, that is, different numbers of uplink symbols and contents of the first information may be configured according to different scenes.

Eighth implementation: the first information is transmitted through a physical sidelink broadcast channel. The first information refers to the slot index of the second S-SSB in a sidelink synchronization period. In addition to the first information, other information also needs to be transmitted in the physical sidelink broadcast channel, as shown in the following table, contents that at least need to be included in a payload of the physical sidelink broadcast channel (PSBCH) are shown in this table. In addition to the contents in the following table, the payload in the physical sidelink broadcast channel may also contain additional information.

The design of the contents of the physical sidelink broadcast channel adopted in this embodiment may configure flexibly the number of uplink symbols and the contents of the first information by changing the contents carried by the physical broadcast channel, that is, different numbers of uplink symbols and contents of the first information may be configured according to different scenes.

Ninth implementation: the first information is transmitted through a physical sidelink broadcast channel. The first information refers to the slot index of the second S-SSB in a sidelink synchronization period. In addition to the first information, other information also needs to be transmitted in the physical sidelink broadcast channel, as shown in the following table, contents that at least need to be included in a payload of the physical sidelink broadcast channel (PSBCH) are shown in this table. In addition to the contents in the following table, the payload in the physical sidelink broadcast channel may also contain additional information.

| Contents in payload of PSBCH | Required number of bits | Notes |
|---|---|---|
| Direct Frame Number (DirectFrameNumber) | 10 | A range of indicated Direct Frame Number: [0.1023] |
| Time-Division Duplex UL-DL configuration (TDD-UL-DL Configuration) | 12 | 12 bits = 3 bits (indicating 8 periods) + 7 bits (indicating the number of uplink slots) + 2 bits (indicating the number of uplink symbols) |
| Slot index of second S-SSB (Slot index of first S-SSB) | 3 | 3 bits are used to indicate any position of 8 possible slot positions in a radio frame in which the second S-SSB is located within a period. |
| S-SSB index (S-SSB index) | 3 | Used to indicate first 3 bits in six bits of a slot index of S-SSB when FR2 is indicated. |
| InCoverage Indicator (InCoverage Indicator) | 1 | Indicating whether the terminal is within a coverage of a base station |
| Reserved bits (Reserved) | 3 | Reserved bits |
| Total | 32 | |

| Contents in payload of PSBCH | Required number of bits | Notes |
| --- | --- | --- |
| Direct Frame Number (DirectFrameNumber) | 10 | A range of indicated Direct Frame Number: [0.1023] |
| Time-Division Duplex UL-DL configuration (TDD-UL-DL Configuration) | 12 | 12 bits = 3 bits (indicating 8 periods) + 7 bits (indicating the number of uplink slots) + 2 bits (indicating the number of uplink symbols) |
| Slot index of second S-SSB (Slot index of first S-SSB) | 2 | 2 bits are used to indicate any position of 4 possible slot positions in a radio frame in which the first S-SSB is located within a period |
| S-SSB index (S-SSB index) | 3 | Used to indicate first 3 bits in six bits of a slot index of S-SSB when FR2 is indicated |
| InCoverage Indicator (InCoverage Indicator) | 1 | Indicating whether the terminal is within a coverage of a base station |
| Reserved bits (Reserved) | 4 | Reserved bits |
| Total | 32 | |

The design of the contents of the physical sidelink broadcast channel adopted in this embodiment may configure flexibly the number of uplink symbols and the contents of the first information by changing the contents carried by the physical broadcast channel, that is, different numbers of uplink symbols and contents of the first information may be configured according to different scenes.

As shown in FIG. 4, an embodiment of the present disclosure also provides an information reception method, which is applied to a terminal, and the method includes a step 41.

In the step 41, a first synchronization signal block (SSB) is received, wherein the first SSB includes a physical broadcast channel (PBCH), first information is configured or carried in a first manner, the first information indicates first offset information about a time-domain position of a second synchronization signal block (SSB) relative to a first position.

Optionally, the first manner refers to at least one of following: a preconfigured manner, a manner of carrying in a PBCH payload, and a manner of carrying in a demodulation pilot reference signal (DMRS) corresponding to the PBCH.

Optionally, the second SSB refers to a SSB sent earliest in a time domain in a synchronization signal block (SSB) burst set to which the first SSB belongs, or, refers to a SSB sent latest in the time domain in the SSB burst set to which the first SSB belongs.

Optionally, the first position refers to a start time-domain position of a radio frame to which the first SSB or the second SSB belongs; or, the first position refers to an end time-domain position of a radio frame to which the first SSB or the second SSB belongs; or, the first position refers to a start time-domain position of a synchronization period to which the first SSB or the second SSB belongs; or, the first position refers to an end time-domain position of a synchronization period to which the first SSB or the second SSB belongs.

Optionally, the time-domain position is a slot index.

Optionally, the first offset information refers to a slot index of the first SSB or the second SSB, or, the first offset information is a difference between the total number of slots included in one radio frame and a slot index of the first SSB or the second SSB.

Optionally, 7 bits are used by the slot index of the first SSB or the second SSB to indicate a maximum of 80 possible slot positions; or 2 bits or 3 bits are used by the slot index of the first SSB or the second SSB to indicate 4 or 8 possible slot positions.

Optionally, the PBCH further carries at least one of following: indication information of the number of uplink slots and indication information of the number of uplink symbols.

Optionally, 4 bits are used by the indication information of the number of uplink symbols to indicate 1 to 13 uplink symbols at most; or 2 or 3 bits are used by the indication information of the number of uplink symbols to indicate 4 or 8 uplink symbols.

Optionally, when the first information is configured in a pre-configured manner, a slot used by the terminal to transmit the first SSB and the second SSB is an uplink slot.

Optionally, the SSB is a sidelink synchronization signal block (S-SSB), the PBCH is a physical sidelink broadcast channel (PSBCH), and the synchronization period is a sidelink synchronization period.

In this embodiment, by receiving the offset information, carried in a physical broadcast channel, of the first synchronization signal block transmitted in one synchronization period relative to the start position of the radio frame in which the synchronization signal block is located, the terminal may be enabled to determine a position of a header of the radio frame according to the position of the synchronization signal block, so that the terminal may complete a synchronization process according to received information related to the synchronization signal block.

As shown in FIG. 5, an embodiment of the present disclosure also provides a terminal 50, including a transceiver 51, a processor 52, and a memory 53. The memory 53 stores a program executable by the processor 52. When the program is executed by the processor, the processor implements a following step: transmitting a first synchronization signal block (SSB), wherein the first SSB includes a physical broadcast channel (PBCH), first information is configured or carried in a first manner, the first information indicates first offset information about a time-domain position of the second synchronization signal block (SSB) relative to a first position.

Optionally, the first manner refers to at least one of following: a preconfigured manner, a manner of carrying in a PBCH payload, and a manner of carrying in a demodulation pilot reference signal (DMRS) corresponding to the PBCH.

Optionally, the second SSB refers to a SSB sent earliest in a time domain in a synchronization signal block (SSB) burst set to which the first SSB belongs, or, refers to a SSB sent latest in the time domain in the SSB burst set to which the first SSB belongs.

Optionally, the first position refers to a start time-domain position of a radio frame to which the first SSB or the second SSB belongs; or, the first position refers to an end time-domain position of a radio frame to which the first SSB or the second SSB belongs; or, the first position refers to a start time-domain position of a synchronization period to which the first SSB or the second SSB belongs; or, the first position refers to an end time-domain position of a synchronization period to which the first SSB or the second SSB belongs.

Optionally, the time-domain position is a slot index.

Optionally, the first offset information refers to a slot index of the first SSB or the second SSB, or, the first offset information is a difference between the total number of slots included in one radio frame and a slot index of the first SSB or the second SSB.

Optionally, 7 bits are used by the slot index of the first SSB or the second SSB to indicate a maximum of 80 possible slot positions, or 2 bits or 3 bits are used by the slot index of the first SSB or the second SSB to indicate 4 or 8 possible slot positions.

Optionally, the PBCH further carries at least one of following: indication information of the number of uplink slots and indication information of the number of uplink symbols.

Optionally, 4 bits are used by the indication information of the number of uplink symbols to indicate 1 to 13 uplink symbols at most; or 2 or 3 bits are used by the indication information of the number of uplink symbols to indicate 4 or 8 uplink symbols.

Optionally, when the first information is configured in the preconfigured manner, a slot used by the terminal to transmit the first SSB and the second SSB is an uplink slot.

Optionally, the SSB is a sidelink synchronization signal block (S-SSB), the PBCH is a physical sidelink broadcast channel (PSBCH), and the synchronization period is a sidelink synchronization period.

It should be noted that the terminal in this embodiment is a terminal corresponding to the method shown in FIG. 1, and the implementations in the above embodiments are applicable to the embodiments of the terminal, and the same technical effect can also be achieved. In the terminal, the transceiver 51 and the memory 53, as well as the transceiver 51 and the processor 52, can be communicatively connected through a bus interface, and a function of the processor 52 can also be realized by the transceiver 51, and functions of the transceiver 51 may also be implemented by the processor 52. It should be noted that the terminal provided by some embodiments of the present disclosure can implement all method steps implemented by the above method embodiments, and can achieve the same technical effect. Here, the same parts and beneficial effects in this embodiment as those of the method embodiments are not described in detail.

As shown in FIG. 6, an embodiment of the present disclosure also provides an information transmission device 60, which is applied to a terminal. The device includes a transceiver module 61, configured to transmit a first synchronization signal block (SSB), wherein the first SSB includes a physical broadcast channel (PBCH), first information is configured or carried in a first manner, the first information indicates first offset information about a time-domain position of the second synchronization signal block (SSB) relative to a first position.

The first manner refers to at least one of following: a preconfigured manner, a manner of carrying in a PBCH payload, and a manner of carrying in a demodulation pilot reference signal (DMRS) corresponding to the PBCH.

Optionally, the second SSB refers to a SSB sent earliest in a time domain in a synchronization signal block (SSB) burst set to which the first SSB belongs, or, refers to a SSB sent latest in the time domain in the SSB burst set to which the first SSB belongs.

Optionally, the first position refers to a start time-domain position of a radio frame to which the first SSB or the second SSB belongs; or, the first position refers to an end time-domain position of a radio frame to which the first SSB or the second SSB belongs; or, the first position refers to a start time-domain position of a synchronization period to which the first SSB or the second SSB belongs; or, the first position refers to an end time-domain position of a synchronization period to which the first SSB or the second SSB belongs.

Optionally, the time-domain position is a slot index.

Optionally, the first offset information refers to a slot index of the first SSB or the second SSB, or, the first offset information is a difference between the total number of slots included in one radio frame and a slot index of the first SSB or the second SSB.

Optionally, 7 bits are used by the slot index of the first SSB or the second SSB to indicate a maximum of 80 possible slot positions, or 2 bits or 3 bits are used by the slot index of the first SSB or the second SSB to indicate 4 or 8 possible slot positions.

Optionally, the PBCH further carries at least one of following: indication information of the number of uplink slots and indication information of the number of uplink symbols.

Optionally, 4 bits are used by the indication information of the number of uplink symbols to indicate 1 to 13 uplink symbols at most; or 2 or 3 bits are used by the indication information of the number of uplink symbols to indicate 4 or 8 uplink symbols.

Optionally, when the first information is configured in the preconfigured manner, a slot used by the terminal to receive the first SSB and the second SSB is an uplink slot.

Optionally, the SSB is a sidelink synchronization signal block (S-SSB), the PBCH is a physical sidelink broadcast channel (PSBCH), and the synchronization period is a sidelink synchronization period.

It should be noted that the device in this embodiment is a device corresponding to the method shown in FIG. 1, and the implementations in the above embodiments are applicable to the embodiment of the device, and the same technical effect can also be achieved. The device may further include a processing module 62, etc., for processing information sent by the transceiver module 61. It should be noted that the above device provided by some embodiments of the present disclosure can implement all method steps implemented by the above method embodiments, and can achieve the same technical effect. Here, the same parts and beneficial effects in this embodiment as those of the method embodiments are not described in detail.

Figure 7:
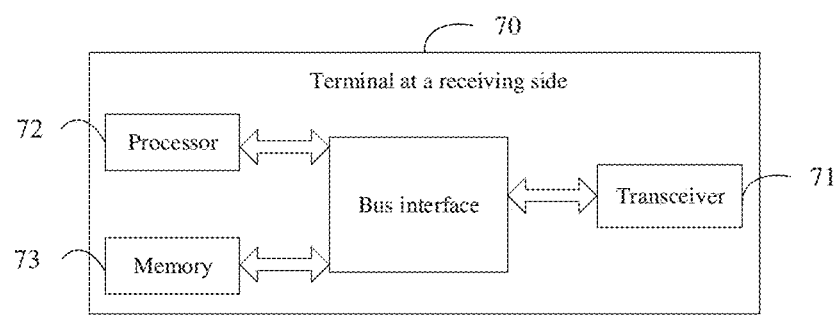
FIG. 7 is a schematic diagram of an architecture of a terminal at a reception side according to an embodiment of the present disclosure.

As shown in FIG. 7, an embodiment of the present disclosure also provides a terminal 70 including a transceiver 71, a processor 72, and a memory 73. A program executable by the processor 72 is stored on the memory 73, and when the processor 72 executes the program, the processor 72 implements a following step: receiving a first synchronization signal block (SSB), wherein the first SSB includes a physical broadcast channel (PBCH), first information is configured or carried in a first manner, the first information indicates first offset information about a time-domain position of a second synchronization signal block (SSB) relative to a first position.

Optionally, the first manner refers to at least one of following: a preconfigured manner, a manner of carrying in a PBCH payload, and a manner of carrying in a demodulation pilot reference signal (DMRS) corresponding to the PBCH.

Optionally, the second SSB refers to a SSB sent earliest in a time domain in a synchronization signal block (SSB) burst set to which the first SSB belongs, or, refers to a SSB sent latest in the time domain in the SSB burst set to which the first SSB belongs.

Optionally, the first position refers to a start time-domain position of a radio frame to which the first SSB or the second SSB belongs; or, the first position refers to an end time-domain position of a radio frame to which the first SSB or the second SSB belongs; or, the first position refers to a start time-domain position of a synchronization period to which the first SSB or the second SSB belongs; or, the first position refers to an end time-domain position of a synchronization period to which the first SSB or the second SSB belongs.

Optionally, the time-domain position is a slot index.

Optionally, the first offset information refers to a slot index of the first SSB or the second SSB, or, the first offset information is a difference between the total number of slots included in one radio frame and a slot index of the first SSB or the second SSB.

Optionally, 7 bits are used by the slot index of the first SSB or the second SSB to indicate a maximum of 80 possible slot positions; or 2 bits or 3 bits are used by the slot index of the first SSB or the second SSB to indicate 4 or 8 possible slot positions.

Optionally, the PBCH further carries at least one of following: indication information of the number of uplink slots and indication information of the number of uplink symbols.

Optionally, 4 bits are used by the indication information of the number of uplink symbols to indicate 1 to 13 uplink symbols at most; or 2 or 3 bits are used by the indication information of the number of uplink symbols to indicate 4 or 8 uplink symbols.

Optionally, when the first information is configured in a pre-configured manner, a slot used by the terminal to receive the first SSB and the second SSB is an uplink slot.

Optionally, the SSB is a sidelink synchronization signal block (S-SSB), the PBCH is a physical sidelink broadcast channel (PSBCH), and the synchronization period is a sidelink synchronization period.

It should be noted that the terminal in this embodiment corresponds to the method shown in FIG. 4, and the implementations in the above embodiments are all applicable to the embodiments of the terminal, and the same technical effects can be achieved. In the terminal, the transceiver 71 and the memory 73, and the transceiver 71 and the processor 72 can be communicatively connected through a bus interface. The function of the processor 72 can also be implemented by the transceiver 71. The functions of the transceiver 71 may also be implemented by the processor 72. It should be noted that the terminal provided by some embodiments of the present disclosure can implement all method steps implemented by the above method embodiments, and can achieve the same technical effect. The same parts and beneficial effects in this embodiment as those of the method embodiments are not described in detail herein.

Figure 8:
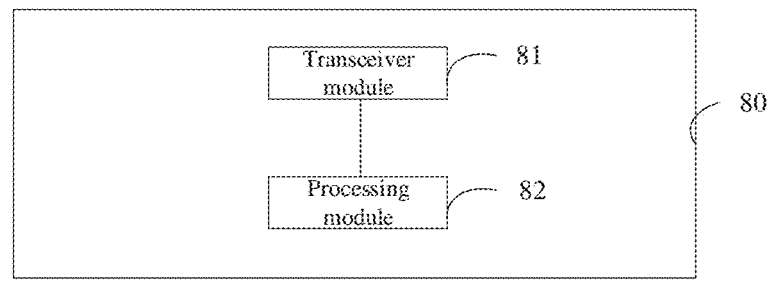
FIG. 8 is a block diagram of an information reception device according to an embodiment of the present disclosure.

As shown in FIG. 8, an embodiment of the present disclosure further provides an information reception device 80 which is applied to a terminal, and the device 80 includes a transceiver module 81, configured to receive a first synchronization signal block (SSB), wherein the first SSB includes a physical broadcast channel (PBCH), first information is configured or carried in a first manner, the first information indicates first offset information about a time-domain position of a second synchronization signal block (SSB) relative to a first position.

Optionally, the first manner refers to at least one of following: a preconfigured manner, a manner of carrying in a PBCH payload, and a manner of carrying in a demodulation pilot reference signal (DMRS) corresponding to the PBCH.

Optionally, the second SSB refers to a SSB sent earliest in a time domain in a synchronization signal block (SSB) burst set to which the first SSB belongs, or, refers to a SSB sent latest in the time domain in the SSB burst set to which the first SSB belongs.

Optionally, the first position refers to a start time-domain position of a radio frame to which the first SSB or the second SSB belongs; or, the first position refers to an end time-domain position of a radio frame to which the first SSB or the second SSB belongs; or, the first position refers to a start time-domain position of a synchronization period to which the first SSB or the second SSB belongs; or, the first position refers to an end time-domain position of a synchronization period to which the first SSB or the second SSB belongs.

Optionally, the time-domain position is a slot index.

Optionally, the first offset information refers to a slot index of the first SSB or the second SSB, or, the first offset information is a difference between the total number of slots included in one radio frame and a slot index of the first SSB or the second SSB.

Optionally, 7 bits are used by the slot index of the first SSB or the second SSB to indicate a maximum of 80 possible slot positions; or 2 bits or 3 bits are used by the slot index of the first SSB or the second SSB to indicate 4 or 8 possible slot positions.

Optionally, the PBCH further carries at least one of following: indication information of the number of uplink slots and indication information of the number of uplink symbols.

Optionally, 4 bits are used by the indication information of the number of uplink symbols to indicate 1 to 13 uplink symbols at most; or 2 or 3 bits are used by the indication information of the number of uplink symbols to indicate 4 or 8 uplink symbols.

Optionally, when the first information is configured in a pre-configured manner, a slot used by the terminal to receive the first SSB and the second SSB is an uplink slot.

Optionally, the SSB is a sidelink synchronization signal block (S-SSB), the PBCH is a physical sidelink broadcast channel (PSBCH), and the synchronization period is a sidelink synchronization period.

It should be noted that the device in this embodiment is a device corresponding to the method shown in FIG. 4, and all implementations in the above embodiments are applicable to the embodiments of the device, and the same technical effects can be achieved. The device may further include a processing module 82, etc., for processing the information sent by the transceiver module 81. It should be noted that the above devices provided by some embodiments of the present disclosure can implement all method steps implemented by the above method embodiments, and can achieve the same technical effect. The same parts and beneficial effects of this embodiment as those of the method embodiments are not described in detail herein.

An embodiment of the present disclosure also provides a processor-readable storage medium having stored therein processor-executable instructions, the processor-executable instructions are used to cause a processor to execute the method as shown in FIG. 1 or FIG. 4, and all implementations in the above method embodiments are applicable to this embodiment, and the same technical effect can be achieved.

Those of ordinary skill in the art will recognize that exemplary elements and algorithm steps described in connection with the embodiments disclosed herein can be implemented in electronic hardware, or a combination of computer software and electronic hardware. Whether these functions are executed in hardware or software depends on the specific application and design constraints of the technical solutions. One skilled in the art may use different methods to implement the described functions for each particular application, but such implementation should not be considered to go beyond the scope of the present disclosure.

It will be apparent to those skilled in the art that for convenience and conciseness of description, reference may be made to corresponding procedures in the foregoing method embodiments for specific operations of the above described systems, devices and units, and will not be repeated here.

In the embodiments provided in the present disclosure, it should be understood that the disclosed devices and methods may be implemented in other ways. For example, the device embodiments described above are merely illustrative, for example, division of the units is only a logical functional division, and there may be other divisions in actual implementation, for example, multiple units or components may be combined or may be integrated into another system, or some features may be omitted or not performed. Optionally, coupling or direct coupling or communication connection shown or discussed may be an indirect coupling or communication connection through some interfaces, devices or units, which may be in an electrical, mechanical or other form.

The units described as separate components may or may not be physically separated, and the components displayed as units may or may not be physical units, i.e. may be located in one place, or may be distributed over multiple network elements. Some or all of the units may be selected according to actual needs to achieve the purpose of the embodiment.

In addition, functional units in each embodiment of the present disclosure may be integrated in one processing element, the units may be separately physically present, or two or more units may be integrated in one element.

The functions, if implemented in the form of software functional units and sold or used as separate products, may be stored in a computer readable storage medium. Based on this understanding, an essential part or a part, contributing to the prior part, of the technical solutions of the present disclosure may be embodied in the form of a software product, the computer software product is stored in a storage medium and includes instructions for causing a computer device (which may be a personal computer, a server, or a network device or the like) to perform all or part of the steps of the methods described in various embodiments of the present disclosure. The aforementioned storage media include various media that can store program codes such as a U disk, a mobile hard disk, a ROM, a RAM, a magnetic disk or an optical disk.

It will be appreciated that the embodiments described in the embodiments of the present disclosure may be implemented in hardware, software, firmware, middleware, microcode, or combinations thereof. In case of implemented in hardware, modules, units, sub-modules, sub-units, and the like may be implemented in one or more of following: Application Specific Integrated Circuits (ASIC), Digital Signal Processing (DSP), Digital Signal Processing Device (DSP Device, DSPD), Programmable Logic Device (PLD), Field-Programmable Gate Array (FPGA), general purpose processors, controllers, microcontrollers, microprocessors, other electronic units for performing the functions described in this disclosure, or combinations thereof.

Furthermore, it should be noted that in the devices and the methods of the present disclosure, components or steps may be disassembled and/or reassembled. These decomposition and/or recombination should be considered equivalent to the present disclosure. Also, the steps of performing the above-described series of processes may naturally be performed in a chronological order in the order described, but need not necessarily be performed in the chronological order, and some steps may be performed in parallel or independently of each other. It will be apparent to one of ordinary skill in the art that all or any of the steps or components of the methods and the devices of the present disclosure, may be implemented in any computing device (including processors, storage media, etc.) or a network of computing devices in hardware, firmware, software, or combinations thereof. This can be accomplished by those of ordinary skill in the art using their basic programming skills after reading the description of the present disclosure.

Accordingly, objects of the present disclosure may also be achieved by running a program or a set of programs on any computing device. The computing device may be a well-known general purpose device. Accordingly, the objects of the present disclosure may also be achieved by merely providing a program product containing program codes for implementing the method or the device. That is, such a program product also constitutes the present disclosure, and a storage medium storing such a program product also constitutes the present disclosure. Obviously, the storage medium may be any known storage medium or any storage medium developed in the future. It should also be noted that in the devices and methods of the present disclosure, it will be apparent that the components or the steps may be disassembled and/or recombined. Such decomposition and/or recombination should be considered equivalent to the present disclosure. Also, the steps of executing the series of processes described above may be executed in a chronological order naturally in the order described, but it is not always necessary to execute in the chronological order. Certain steps may be performed in parallel or independently of each other.

What has been described above is optional embodiments of the present disclosure, and it should be noted that a number of modifications and refinements may be made by those of ordinary skill in the art without departing from the principles described herein, these modifications and refinements are also within the scope of the present disclosure.

What is claimed is:

1. An information transmission method performed by a terminal, the method comprising:
   transmitting a first synchronization signal block (SSB), wherein the first SSB comprises a physical broadcast channel (PBCH), first information is configured or carried in a first manner, the first information indicates first offset information about a time-domain position of a second synchronization signal block (SSB) relative to a first position, the first position refers to an end time-domain position of a radio frame to which the first SSB or the second SSB belongs; or, the first position refers to a start time-domain position of a synchronization period to which the first SSB or the second SSB belongs; or, the first position refers to an end time-domain position of a synchronization period to which the first SSB or the second SSB belongs, wherein the second SSB refers to a SSB sent earliest in a time domain in a synchronization signal block (SSB) burst set to which the first SSB belongs, or, refers to a SSB sent latest in the time domain in the SSB burst set to which the first SSB belongs.

2. The information transmission method according to claim 1, wherein, the first manner refers to at least one of following:
a preconfigured manner, a manner of carrying in a PBCH payload, and a manner of carrying in a demodulation reference signal (DMRS) corresponding to the PBCH.

3. The information transmission method according to claim 1, wherein the time-domain position is a slot index.

4. The information transmission method according to claim 1, wherein, when the first information is configured in a pre-configured manner, a slot used by the terminal to transmit the first SSB and the second SSB is an uplink slot.

5. The information transmission method according to claim 1, wherein the SSB is a sidelink synchronization signal block (S-SSB), the PBCH is a physical sidelink broadcast channel (PSBCH), and the synchronization period is a sidelink synchronization period.

6. An information reception method performed by a terminal, comprising:
receiving a first synchronization signal block (SSB), wherein the first SSB comprises a physical broadcast channel (PBCH), first information is configured or carried in a first manner, the first information indicates first offset information about a time-domain position of a second synchronization signal block (SSB) relative to a first position, the first position refers to an end time-domain position of a radio frame to which the first SSB or the second SSB belongs; or, the first position refers to a start time-domain position of a synchronization period to which the first SSB or the second SSB belongs; or, the first position refers to an end time-domain position of a synchronization period to which the first SSB or the second SSB belongs, wherein the second SSB refers to a SSB sent earliest in a time domain in a synchronization signal block burst set to which the first SSB belongs, or, refers to a SSB sent latest in the time domain in the synchronization signal block burst set to which the first SSB belongs.

7. The information reception method according to claim 6, wherein, the first manner refers to at least one of following:
a preconfigured manner, a manner of carrying in a PBCH payload, and a manner of carrying in a demodulation reference signal (DMRS) corresponding to the PBCH.

8. The information reception method according to claim 6, wherein the time-domain position is a slot index.

9. The information reception method according to claim 6, wherein, when the first information is configured in a pre-configured manner, a slot used by the terminal to receive the first SSB and the second SSB is an uplink slot.

10. The information reception method according to claim 6, wherein the SSB is a sidelink synchronization signal block (S-SSB), the PBCH is a physical sidelink broadcast channel (PSBCH), and the synchronization period is a sidelink synchronization period.

11. A terminal, comprising:
a transceiver, a processor, and a memory, wherein a program executable by the processor is stored on the memory, wherein when the program is executed by the processor, the processor implements following:
transmitting a first synchronization signal block (SSB), wherein the first SSB comprises a physical broadcast channel (PBCH), first information is configured or carried in a first manner, the first information indicates first offset information about a time-domain position of a second synchronization signal block (SSB) relative to a first position, the first position refers to an end time-domain position of a radio frame to which the first SSB or the second SSB belongs; or, the first position refers to a start time-domain position of a synchronization period to which the first SSB or the second SSB belongs; or, the first position refers to an end time-domain position of a synchronization period to which the first SSB or the second SSB belongs, wherein the second SSB refers to a SSB sent earliest in a time domain in a synchronization signal block burst set to which the first SSB belongs, or, refers to a SSB sent latest in the time domain in the synchronization signal block burst set to which the first SSB belongs.

12. The terminal according to claim 11, wherein, the time-domain position is a slot index.

13. The terminal according to claim 11, wherein the SSB is a sidelink synchronization signal block (S-SSB), the PBCH is a physical sidelink broadcast channel (PSBCH), and the synchronization period is a sidelink synchronization period.

14. A terminal, comprising:
a transceiver, a processor, and a memory, wherein a program executable by the processor is stored on the memory, and when the program is executed by the processor, the processor implements steps of the information reception method according to claim 6.

15. The terminal according to claim 14, wherein, the time-domain position is a slot index.

16. The terminal according to claim 14, wherein the SSB is a sidelink synchronization signal block (S-SSB), the PBCH is a physical sidelink broadcast channel (PSBCH), and the synchronization period is a sidelink synchronization period.

* * * * *